(12) United States Patent
Stuve

(10) Patent No.: US 7,521,922 B2
(45) Date of Patent: Apr. 21, 2009

(54) LINEAR POSITION SENSOR

(75) Inventor: Steven R Stuve, Lake Mills, WI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 261 days.

(21) Appl. No.: 11/557,209

(22) Filed: Nov. 7, 2006

(65) Prior Publication Data

US 2008/0106259 A1  May 8, 2008

(51) Int. Cl.
*G01B 7/14* (2006.01)
(52) U.S. Cl. .................... 324/207.2; 324/207.24
(58) Field of Classification Search .......... 324/207.2, 324/207.25, 207.21, 207.24; 338/32 R, 32 H
See application file for complete search history.

(56) References Cited

U.S. PATENT DOCUMENTS

| | | | |
|---|---|---|---|
| 4,039,936 A | 8/1977 | Jones et al. | |
| 4,875,008 A | 10/1989 | Lorenzen | |
| 4,926,122 A | 5/1990 | Schroeder et al. | |
| 4,939,456 A | 7/1990 | Morelli et al. | |
| 5,159,268 A | 10/1992 | Wu | |
| 5,359,287 A | 10/1994 | Watanabe et al. | |
| 5,365,791 A * | 11/1994 | Padula et al. | 73/745 |
| 5,450,009 A | 9/1995 | Murakami | |
| 5,475,304 A | 12/1995 | Prinz | |
| 5,477,143 A | 12/1995 | Wu | |
| 5,656,936 A | 8/1997 | Ao et al. | |
| 5,814,985 A | 9/1998 | Oudet | |
| 5,859,531 A * | 1/1999 | Maurice et al. | 324/207.13 |
| 5,936,400 A | 8/1999 | Tchertkov et al. | |
| 6,064,198 A | 5/2000 | Wolf et al. | |
| 6,194,893 B1 | 2/2001 | Yokotani et al. | |
| 6,218,829 B1 | 4/2001 | Wittenstein et al. | |
| 6,232,770 B1 | 5/2001 | Schroeder | |
| 6,246,234 B1 | 6/2001 | Yokotani et al. | |
| 6,553,840 B2 | 4/2003 | Fournier et al. | |
| 6,753,680 B2 * | 6/2004 | Wolf | 324/207.2 |
| 6,753,681 B2 * | 6/2004 | Enomoto et al. | 324/207.25 |
| 6,992,478 B2 * | 1/2006 | Etherington et al. | 324/207.2 |
| 7,088,095 B1 | 8/2006 | Busch | |
| 7,151,369 B1 * | 12/2006 | Wolf | 324/207.24 |
| 2004/0169503 A1 * | 9/2004 | Enomoto et al. | 324/207.2 |
| 2006/0061353 A1 * | 3/2006 | Etherington et al. | 324/207.2 |
| 2007/0018765 A1 * | 1/2007 | Takeuchi | 335/229 |

* cited by examiner

*Primary Examiner*—Jay M Patidar
(74) *Attorney, Agent, or Firm*—Lonnie Drayer; Patrick Stiennon

(57) ABSTRACT

A linear sensor uses four spaced apart magnets arranged in a rectangular array and has an axis of symmetry. Each magnet has a staircase shape of at least two steps ascending towards a centerline. Each magnet of the array has a single N-S with magnets arranged as mirror images about the axis of symmetry having opposed poles, and magnets located on diagonals defined by the rectangular array having the same pole facing the axis of symmetry. The linear sensor employs a magnetic field sensor such as a programmable Hall effect sensor that is mounted for movement relative to the magnetic array along the axis of symmetry. The height of the steps defining the staircase shape of the magnets is selected to produce a magnetic field of selected linearity along a selected portion of the axis of symmetry.

25 Claims, 3 Drawing Sheets

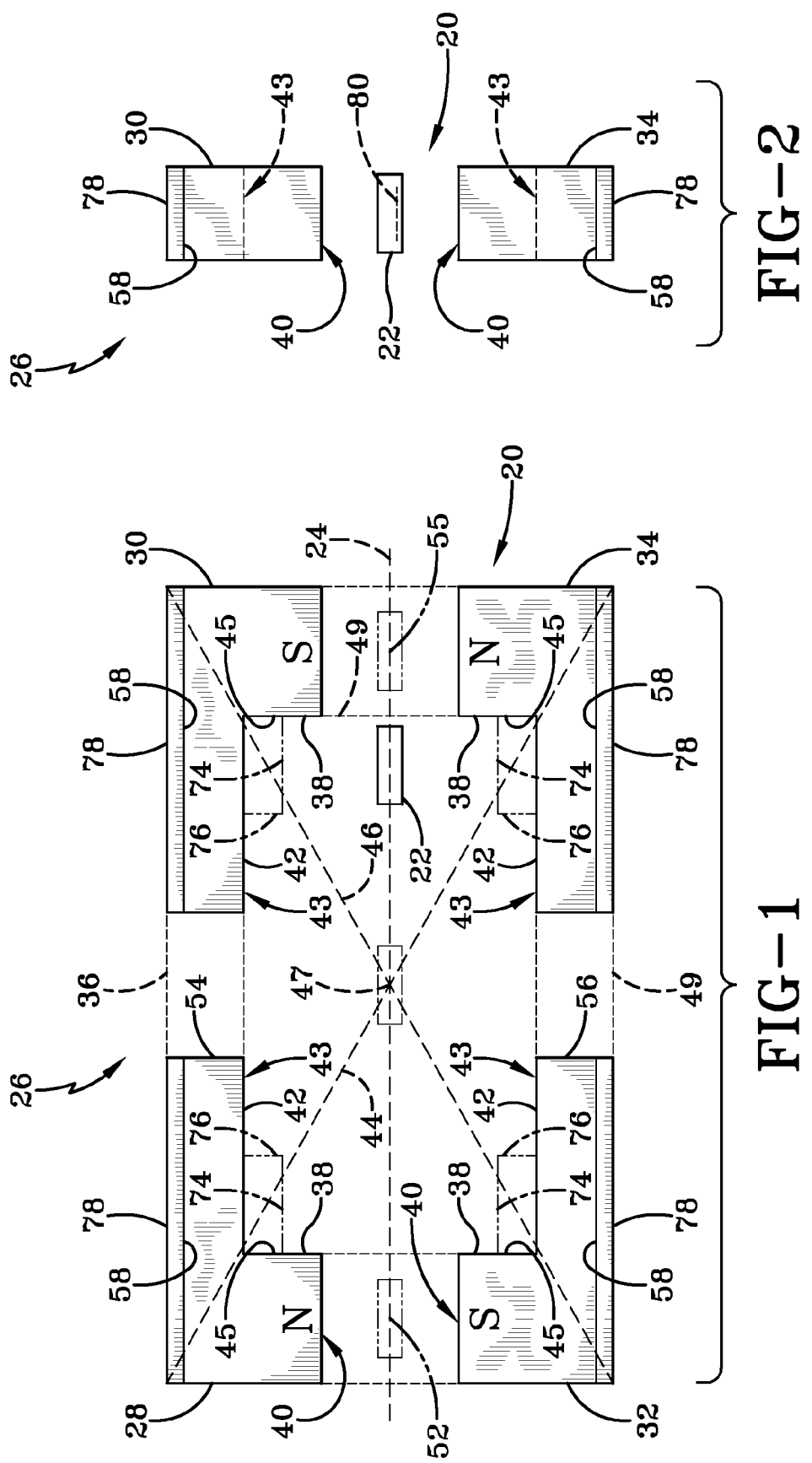

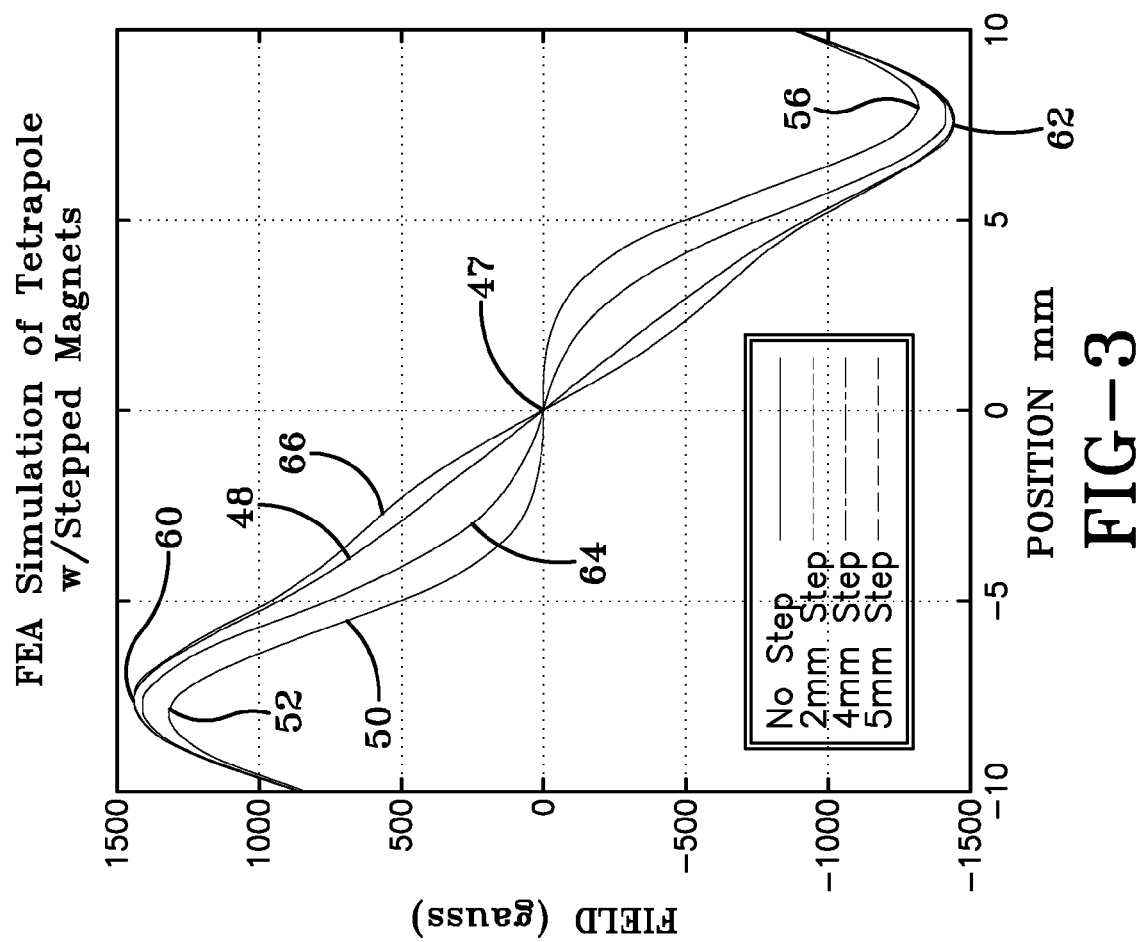

LINEAR POSITION SENSOR

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates generally to position measurement devices in general and more particularly to devices used to sense linear motion using magnetic fields.

It is often necessary to measure the position or displacement of two elements relative to each other. A particularly useful measurement is the linear displacement of a moving stage as it travels along a stationary base. This displacement can be measured with many different sensing technologies over a large range of accuracies, with different levels of complexity, and at a wide range of costs.

Some common apparatus for measuring linear displacement employ linear encoders, capacitive sensors, eddy current sensors, a linear variable differential transformer, photoelectric or fiber optic sensors, or magnetic field sensors. Linear encoders use a glass or metal ruler that is made of a high stability material so that changes in temperature do not affect measurement accuracy. These materials, such as quartz, steel, invar, glass or ceramics generally require special machining techniques to manufacture and thus are more expensive.

Capacitive sensors are used with both conductive and nonconductive target materials but are very sensitive to environmental variables that change the dielectric constant of the medium between the sensor and the target, usually air. Eddy current sensors contain two coils: an active coil that indicates the presence of a conducting target, and a secondary coil that completes a bridge circuit. A linear variable differential transformer (LVDT) sensor has a series of inductors in a hollow cylindrical shaft and a solid cylindrical core. The LVDT produces an electrical output that is proportional to the displacement of the core along the shaft. The size and mounting of these coils or cores and the sensitivity of measurement are competing design factors in the use of eddy current or LVDT sensors.

Photoelectric and fiber optic sensors use beams of light to measure distance or displacement. The photoelectric sensor uses free-space transmission of light while the fiber optic sensor uses a pair of adjacent fibers to carry light to a target and receive reflected light from the object. Alignment of the fibers and the complexity of the optics needed to maintain the light path are difficulties in using this technology.

Magnetic sensors such as the Hall effect sensor, GMR sensor, or an AMR sensor can be used with a linear array of teeth or alternating magnetic poles to produce a sinusoidal output indicative of the sensor's linear motion, however the initial position must be determined and each tooth or magnetic pole must be counted and phase data analyzed for greatest accuracy. A sensor that outputs voltage that is directly proportional to linear position has many advantages. One such sensor uses a pair of magnets with convex surfaces facing each other of the same magnetic pole. However, this type of sensor requires forming a nonlinear curve on the faces of the magnets, which, depending on the magnetic material used, can be costly.

What is needed is a magnetic linear displacement sensor that produces direct correspondence between position and magnetic field strength that can be constructed with a simple magnet geometry.

SUMMARY OF THE INVENTION

The present invention is a linear magnetic sensor that employs four spaced apart magnets arranged symmetrically and positioned to form the corners of a first rectangle in a four pole array. The rectangle defines bisecting diagonals that define a center point with an axis of symmetry passing through the center point and bisecting angles defined by the diagonals. Each magnet is in the shape of a staircase having at least two steps. The magnets are arranged as mirror images about the axis of symmetry, with the steps facing the axis of symmetry and the step closest to the axis of symmetry arranged furthest from the center point. The steps define portions of the sides of at least one smaller rectangle within the rectangle and having a center coincidental with the center point. Magnets on a common diagonal having similar poles, and magnets symmetrically spaced about the axis of symmetry having opposite poles. This arrangement of magnets is used to create a magnetic field that varies substantially nearly linearly along the axis of symmetry.

A programmable Hall effect sensor arranged with the sensor element parallel to the axis of symmetry detects linear motion of the Hall effect sensor along the axis of symmetry with respect to the magnetic array. The Hall effect sensor may be programmed with coefficients to substantially completely linearize the output of the Hall effect sensor, which output can then be directly correlated with relative linear motion between the Hall effect sensor and the magnetic array. Ferrous pole pieces on the sides of the magnets away from the axis of symmetry can be used to cause an increase in the magnetic field of each magnet of the magnetic array. The addition of a pole piece reduces the amount of magnet material needed to form the magnetic array of a selected magnetic field strength.

It is a feature of the present invention to form a linear displacement sensor with a uniform linearly sloping magnetic field along the axis of displacement.

It is a further feature of the present invention to form a linear displacement sensor utilizing magnets of simple geometry.

It is a further feature of the present invention to form a linear displacement sensor that is less sensitive to displacement of the magnetic sensor off the sensing axis.

Further features and advantages of the invention will be apparent from the following detailed description when taken in conjunction with the accompanying drawings.

BRIEF DESCRIPTION OF THE DRAWINGS

FIG. 1 is a side elevation view of a four magnet array and linear displacement sensor of the invention.

FIG. 2 is an end elevation view of the four magnet array and linear displacement sensor of FIG. 1.

FIG. 3 is an illustrative graphical view of the magnetic field strength along the axis of an array of four magnets of the type shown in FIG. 1 at three different step heights.

DESCRIPTION OF THE PREFERRED EMBODIMENTS

Figure 4:
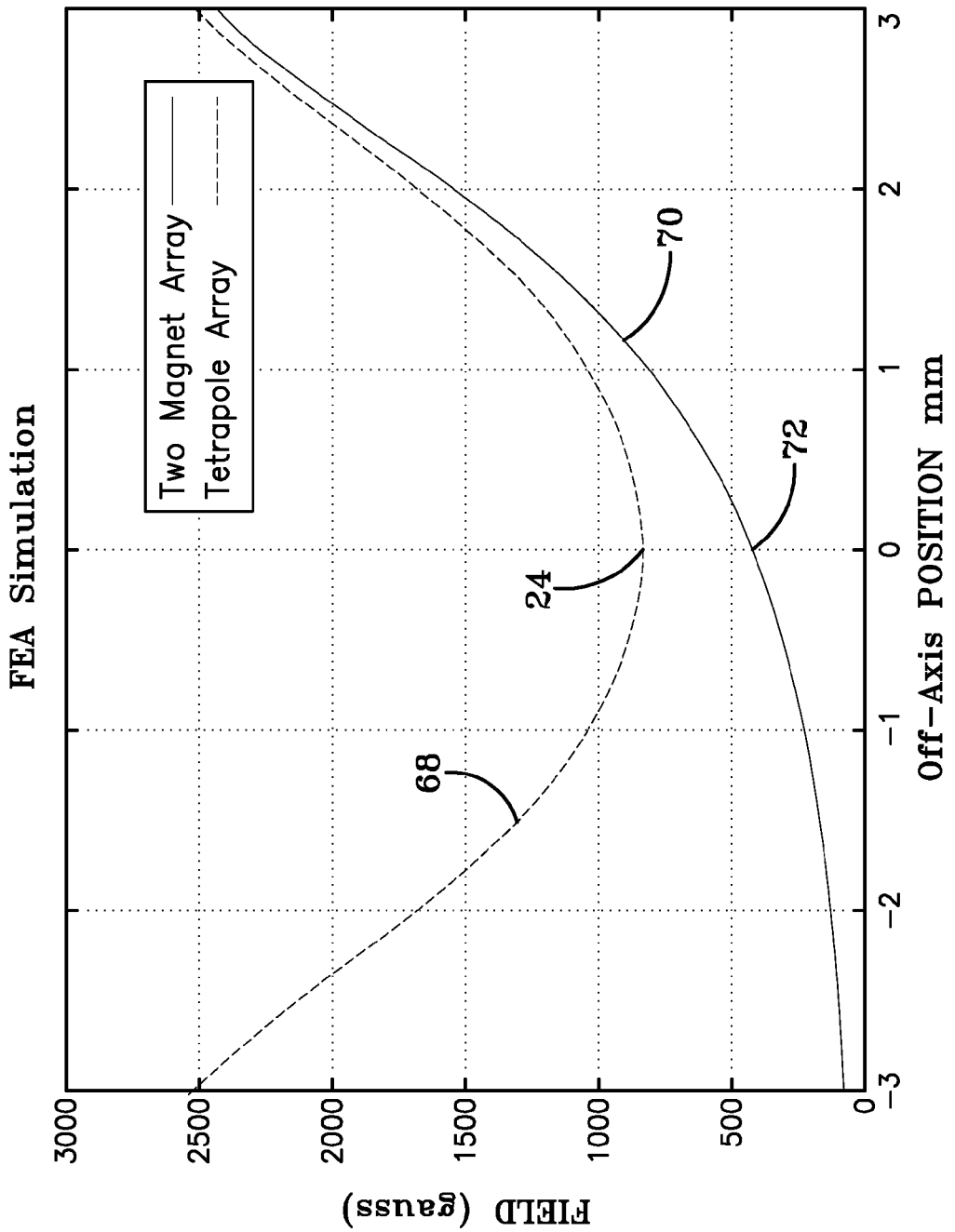
FIG. 4 is an illustrative graphical view of off axis magnetic field strength variation for an array of two magnets versus the array of four magnets of FIG. 1.

Referring more particularly to FIGS. 1-4, wherein like numbers refer to similar parts, a linear motion sensor 20 is shown in FIG. 1. The linear motion sensor 20 is comprised of a magnetic field sensor 22 which senses magnetic field strength and polarity which is moved along a symmetry axis 24 of an array 26 of four symmetrically arranged magnets 28, 30, 32, and 34. Each of the magnets is arranged in one of the four quadrant of a rectangle 36. Each magnet 28, 30, 32, and 34 is in the shape of a staircase having at least two steps, a proximal step 38 with a pole surface 40 closest to the line of symmetry 24, and a distal step 42 which is spaced further from the line of symmetry and has a pole surface 43. Axial spacing between the steps of each magnet defines a step side 45. The four step sides 45 together define a smaller rectangle 49 having a center coincident with the center point 47 of the larger rectangle 36 that lies on the line of symmetry 24. Each magnet of the array of magnets 26 is arranged with a single N-S or S-N pole, as shown in FIG. 1. Magnets 28, 34 which are which lie along a first diagonal 44 of the rectangle 36 are arranged with the north pole facing the line of symmetry 24. The magnets 32, 30 which lie along a second diagonal 46 of the rectangle 36 are arranged with the south pole facing the line of symmetry 24. The diagonals 44, 46 cross at the center 47 of the rectangle 36 and the symmetry axis 24 passes through the center 47 bisecting angles formed between the diagonals. Magnets 28, 32, which are arranged as mirror images with respect to the line of symmetry 24, are arranged with unlike poles facing each other. Furthermore, magnets 30, 34 which are also arranged as mirror images with respect to the line of symmetry 24, also are arranged with unlike poles facing each other; however, the arrangement of the polls N-S is reversed with respect to the poll arrangement S-N of the magnets 28, 32.

As shown in FIG. 1, the sensor 22 is moved along the line of symmetry 24 by either motion of the sensor or of the magnetic array 26. The sensor 22 is preferably a Hall effect sensor with onboard logic that can be programmed to adjust to the output of the Hall affect device according to an onboard program. A suitable device is, for example, an HAL 855 available from Micronas GmbH of Freiburg, Germany.

FIG. 3 shows a graph 48 of a simulation of the output of the Hall effect sensor as it is moved along the axis of symmetry 24 from one side to the other of the rectangle 36 of the magnetic array 26. Also illustrated in FIG. 3 is a graph 50 of a simulation of the output of the Hall effect sensor as it moves along the symmetry axis in an arrangement wherein the spacing of the magnets remains as illustrated in FIG. 1 but the lower steps 42 of each magnet are completely eliminated. The graph 50 shows how the field strength increases as the sensor 22 approaches a point 52 of maximum field strength between opposed magnets 28, 32, and decreases as the sensor approaches the center 47 of the rectangle 36. As the sensor 22 continues to move toward a point 55 of maximum field strength between opposed magnets 30, 34, the magnetic field continues to decrease because the opposed poles of the second pair of magnets 30, 34 are reversed. The arrangement of magnets without a step illustrated by the graph 50 shows that such an arrangement is unsuitable for a linear transducer because the field strength remains essentially constant for a considerable distance on either side of the center 47 and thus magnetic field strength could not be used to accurately determine position along symmetry axis 24.

In the magnetic array 26 illustrated in FIG. 1, each magnet 28, 30, 32, 34 has a step height of 4 mm as measured from a rear face 58 of each magnet. These distal steps 42 on the upper magnets 28, 30 extend toward each other and define an upper gap 54 between magnets 28, 30 above the axis of symmetry 24, and centered above the center 47 of the rectangle 36. The distal steps 42 the lower magnets 32, 34 extend toward each other and define a lower gap 56 between the lower magnets 32, 34 that is positioned below the center 47 of the rectangle 36. As shown in FIG. 3, the graph 48 is very nearly linear between a point 60 between proximal steps 38 of the magnets 28, 32 of FIG. 1 and a point 62 between proximal steps 38 of magnets 30, 34. In particular, the slope of the magnetic field strength remains nearly constant as the sensor 22 crosses the center 47 and is between the upper gap 54 and the lower gap 56. The magnet array 26 of FIG. 1 provides a relatively steeply sloped linear change in magnetic field strength over a range of approximately 15 mm between point 60 and point 62. A graph of magnetic field strength for a 2 mm step 64, and a 5 mm step 66 are also shown in FIG. 3 illustrating how step size can be varied to search for the most linear change in magnetic field strength within a magnet array similar to the array 26 shown in FIG. 1. Any remaining nonlinearity of the magnetic field strength slope can be corrected for by programming nonvolatile memory, which forms a part of the programmable Hall effect sensor 22. Thus the output of the Hall effect sensor 22 may be read directly as linear position. Of course inherent accuracy is lost if the slope of magnetic field strength at any point approaches zero.

The four magnet array 26 also provides nearly constant magnetic field strength for small deviations from the symmetry axis 24. FIG. 4 shows a simulation of off-axis magnetic field strength for points on the graph 48 where the magnetic field strength is approximately 800 gauss. The graph 68 shows a slope of zero in the immediate vicinity of the symmetry axis 24 that remains small for approximately 0.5 mm on either side of the symmetry axis 24. This is in contrast to a two magnetic array comprising, for example the lower magnets 32, 34 of FIG. 1, where the graph 70 of the off axis change in magnetic field has a constant and relatively steep positive slope on either side of a line 72 in the same relative position as the symmetry axis 24.

The individual magnets 28, 30, 32, 34 as shown in FIG. 1 can employ pole pieces 78 which increase the strength of the magnetic fields generated by the magnets. Because high-strength magnets are often made from relatively rare elements, the cost of the magnets can be reduced by decreasing the size of the magnets while maintaining the field strength through the use of the pole pieces 78 which are constructed from magnetically permeable material typically a low cost soft ferrous alloy. The pole pieces may be plates affixed to the rear surfaces 58 of each of the magnets 28, 30, 32, 24 of the array 26.

An alternative embodiment linear motion sensor 74 can be constructed where each magnet of the array has with three or more steps, as shown in phantom lines in FIG. 1. In the alternative embodiment, a third step 76 is situated intermediate in distance from the symmetry axis 24 having a spacing between the proximal step 38 and the distal step 42. The use of a third step 76 is advantageous when a linear motion sensor with a relatively long sensing distance is required, for example a sensor with a substantially linear change in magnetic field strength over a distance of 30 mm was constructed using an array of four three-step magnets.

In the design of the linear motion sensor 20 the following design variables can be used to achieve a desired shape of a graph of magnetic field strength versus linear position: varying the size of the rectangle 36 which defines the position of the magnets; varying the number of steps formed in each magnet and the distance each step is spaced from the symmetry axis; varying the width of the step along the symmetry axis; varying the width of the gap 54, 56 formed between the magnets along the symmetry axis; varying the type of magnetic material used in the size of the magnets; and employing pole pieces.

Although generally the most linear graph of field strength versus distance is desired for uniform position sensing resolution, a magnetic field graph can vary significantly from the linear and still, by means of the programmable logic in the sensor, provide a linear output. In this arrangement, where the slope of the graph of magnetic field strength with respect to linear position is not constant, the variation in slope affects the inherent accuracy, which variation can be used to improve accuracy over a specific range by optimizing the magnets to have greater slope where greater resolution of linear position is desired, at the expense of somewhat lesser accuracy whether slope is less.

In a practical application employing the sensor 20, the four magnets 28, 30, 32, 34 are mounted in a housing which is mounted for linear motion, and the Hall effect sensor 22 is fixedly mounted to a circuit board, Typically the housing containing the four magnets is mounted to travel on rails or some similar arrangement which constrains the symmetry axis 24 to move over the Hall effect sensor 22.

It should be understood that the programmable sensor 22 includes a Hall effect device or sensor element 80 within the sensor package. The device or sensor element 80 is arranged parallel to the axis of symmetry and parallel to the magnetic pole surfaces 40 such that the magnetic field lines between the magnets of the array 26 are perpendicular to the Hall effect device. The sensing direction of the Hall effect device or sensor element 80 is perpendicular to its sensor element, and thus it is sensitive to magnetic field strength in a direction perpendicular to the axis of symmetry 24.

It should also be understood that the processing of the signal from the Hall effect device 80 may be done outside the package that houses the Hall effect device. Furthermore, it should be understood that other types of magnetic field sensors such as, for example, giant magnetoresistive (GMR) or Anisotropic Magneto-Resistive (AMR) sensors, with or without on-chip programmability could be used. In order to minimize the effect of external magnetic fields on the sensing system 20, the magnetic field used by the sensor should be maximized because by utilizing the entire measurement range of the magnetic sensor, variation in the output of the sensor due to external magnetic noise is minimized. To minimize package size, magnets of high magnetic field strength may be used such as alnico (an aluminum-nickel-cobalt alloy), or samarium-cobalt (SmCo), and neodymium-iron-boron (NdFeB). Each magnet 28, 30, 32, 34 may be formed as a single piece or may be formed by combining magnets of simpler shape by, for example, bonding one rectangular magnet on to another. The pole surfaces 40, 43, while generally planar and parallel to each other and the symmetry axis 24, may incorporate such slight variations as do not substantially affect the benefits described.

It should be understood that where the claims refer to relationships as being "substantially parallel", "substantially aligned", etc., it is meant to encompass such minor variations from a parallel state, alignment, etc. which still preserve the functionality of the device.

The linear motion sensor 20 is designed to allow slight misalignments in the magnets in the sensor without introducing substantial errors in the output of the sensor. Furthermore, using the onboard logic it is possible to calibrate each linear motion sensor by controlled actuation accompanied by programming of onboard logic to linearize the output of the magnetic field sensor 22, taking into account the measured deviance from linearity due to geometry misalignment or variations in the magnetic fields of the magnets.

It should be understood that the arrangement of four similar or identical magnets at the corners of a rectangle, wherein magnets positioned across from each other along the line of symmetry have opposed poles and magnets connected by a diagonal have the same pole facing the symmetry axis, need not be limited to magnets having a staircase shape facing the line of symmetry. Thus the profile of the magnets, rather than having a staircase shape of two or more steps, can be a completely free variable that is optimized according to desired criteria of magnetic field strength along the axis of symmetry.

It is understood that the invention is not limited to the particular construction and arrangement of parts herein illustrated and described, but embraces all such modified forms thereof as come within the scope of the following claims.

I claim:

1. A linear position sensor comprising:
    a magnetic field strength sensor positioned on substantially an axis;
    a first magnet extending parallel to the axis, and spaced from the axis, the first magnet having a pole of a first polarity arranged facing the axis;
    a second magnet arranged as a mirror image of the first magnet about the axis with respect to the first magnet, the second magnet facing the axis and the first magnet, the second magnet having a pole of a second polarity that is opposite to the first polarity of the first magnet;
    a third magnet extending parallel to the axis, and spaced from the axis, the third magnet having a pole of the second polarity arranged facing the axis;
    a fourth magnet arranged as a mirror image about the axis with respect to the third magnet, the fourth magnet having a pole of the first polarity opposite the second polarity of the third magnet;
    wherein the third magnet and the fourth magnet are arranged spaced from the first magnet and second magnet arranged as a mirror images of the first magnet and second magnet about a plane perpendicular to the axis;
    wherein the first magnet, the second magnet, the third magnet, and the fourth magnet, are fixedly mounted with respect to each other;
    wherein at least one of the magnetic field strength sensor or the magnets are mounted for movement with respect to the other along the axis; and
    wherein each of the four spaced apart magnets has portion facing the axis which form a first planar step spaced from the axis, and a second planar step spaced further from the axis than the first step, wherein the second steps are closer to the plane pernendicular to the axis than the first steps.

2. The linear position sensor of claim 1 wherein the magnetic field strength sensor is a programmable Hall effect sensor.

3. The linear position sensor of claim 1 wherein the first magnet, the second magnet, the third magnet, and the fourth magnet each have pole pieces mounted thereto.

4. A linear position sensor comprising:
    four spaced apart magnets arranged symmetrically positioned to form four corners of a rectangle, which rectangle defines two diagonals, which meet to define a center point, and an axis of symmetry passing through the center point and bisecting angles defined by the diagonals, each magnet having portions facing the axis of symmetry;

each magnet having a pole facing the axis of symmetry, wherein magnets lying on the same diagonal have identical poles facing the axis of symmetry, and magnets symmetrically positioned with respect to the axis of symmetry have opposed poles;

a magnetic field strength sensor arranged for relative movement substantially along the axis of symmetry with respect to the four magnets; and the first magnet, the second magnet, the third magnet, and the fourth magnet each have portions facing the axis of symmetry which form a first planar step spaced from the axis of symmetry, and a second planar step spaced further from the axis of symmetry than the first step, wherein the second steps more closer to the plane pernendicular to the axis than the first steps.

5. The linear position sensor of claim 4, wherein the magnetic field strength sensor is a programmable Hall-effect sensor.

6. A linear position sensor comprising:

a magnetic field strength sensor positioned on substantially an axis;

a first magnet extending parallel to the axis, and spaced from the axis, the first magnet having at least two steps such that a first portion of the first magnet is closer to the axis than a second portion of the first magnet, the first magnet having a pole of a first polarity arranged facing the axis;

a second magnet arranged as a mirror image of the first magnet about the axis with respect to the first magnet, the second magnet having at least two steps, such that a first portion of the second magnet is closer to the axis than a second portion of the second magnet, the second magnet facing the axis and the first magnet, the second magnet having a pole of a second polarity which is opposite to the first polarity of the first magnet;

a third magnet extending parallel to the axis, and spaced from the axis, the third magnet having at least two steps, such that a first portion of the third magnet is closer to the axis than a second portion of the third magnet, the third magnet having a pole of the second polarity arranged facing the axis;

a fourth magnet arranged as a mirror image about the axis with respect to the third magnet, the fourth magnet having at least two steps, such that a first portion of the fourth magnet is closer to the axis than a second portion of the fourth magnet, the fourth magnet facing the axis and the third magnet, the fourth magnet having a pole of the first polarity opposite the second polarity of the third magnet;

wherein the third magnet and the fourth magnet are arranged spaced from the first magnet and second magnet arranged as a mirror images of the first magnet and second magnet about a plane perpendicular to the axis;

wherein the second portion of the first magnet, the second portion of the second magnet, the second portion of the third magnet, and the second portion of the fourth magnet, are closer to the plane perpendicular to the axis than the first portion of the first magnet, the first portion of the first magnet, the first portion of the third magnet, and the first portion of the fourth;

wherein the first magnet, the second magnet, the third magnet, and the fourth magnet, are fixedly mounted with respect to each other; and wherein at least one of the magnetic field strength sensor or the magnets are mounted for movement with respect to the other along the axis.

7. The linear position sensor of claim 6 wherein the first magnet, the second magnet, the third magnet, and the fourth magnet each have only two steps.

8. The linear position sensor of claim 6 wherein the magnetic field strength sensor is a programmable Hall-effect sensor.

9. The linear position sensor of claim 6 wherein the first magnet, the second magnet, the third magnet, and the fourth magnet are mounted for motion with respect to the magnetic field strength sensor.

10. The linear position sensor of claim 6 wherein the first magnet, the second magnet, the third magnet, and the fourth magnet each have pole pieces mounted thereto.

11. The linear position sensor of claim 6 wherein the first magnet, the second magnet, the third magnet, and the fourth magnet each have portions forming a third intermediate step between each magnet's first step and second step.

12. The linear position sensor of claim 6 wherein the first magnet, the second magnet, the third magnet, and the fourth magnet are selected and arranged to maximize a rate of change of magnetic field strength with respect to distance along the axis and over a selected portion of the axis.

13. A linear position sensor comprising:

four spaced apart magnets arranged symmetrically positioned to form four corners of a rectangle which defines two diagonals, said diagonals meeting to define a center point, and an axis of symmetry passing through the center point and bisecting angles defined by the diagonals, each magnet having at least two steps substantially parallel to the axis of symmetry so that the steps define portions of the sides of at least one smaller rectangle within the rectangle and having a center coincident with the center point; each magnet having a pole facing the axis of symmetry, wherein magnets lying on the same diagonal have identical poles facing the axis of symmetry, and magnets symmetrically positioned with respect to the axis of symmetry have opposed poles; and a magnetic field strength sensor arranged for relative movement substantially along the axis of symmetry with respect to the four magnets.

14. The linear position sensor of claim 13 wherein each of the four spaced apart magnets has only two steps.

15. The linear position sensor of claim 13 wherein the magnetic field strength sensor is a programmable Hall effect sensor.

16. The linear position sensor of claim 13 wherein the magnetic field strength along the axis of symmetry varies substantially linearly at least across the smaller rectangle.

17. The linear position sensor of claim 13 wherein the first, second, third, and fourth magnets are mounted for motion with respect to the magnetic field strength sensor.

18. The linear position sensor of claim 13 wherein the first, second, third, and fourth magnets each have pole pieces mounted to the magnet.

19. The linear position sensor of claim 13 wherein each magnet has three steps.

20. The linear position sensor of claim 13 wherein the four magnets are selected and arranged to maximize a rate of change of magnetic field strength with respect to distance along the symmetry axis along a selected portion of the symmetry axis.

21. A linear position sensor comprising:

four spaced apart substantially identical magnets arranged symmetrically positioned to form four corners of a rectangle, which rectangle defines two diagonals which meet to define a center point, and an axis of symmetry passing through the center point and bisecting angles defined by the diagonals, each magnet having the shape of a staircase with at least one first step spaced from the axis of symmetry, and at least one second step spaced closer to the axis of symmetry than the first step;

wherein magnets arranged in diagonal corners have identical poles facing the axis of symmetry, and magnets symmetrically positioned with respect to the axis of symmetry have opposed poles; and a magnetic field strength sensor arranged for relative movement substantially along the axis of symmetry with respect to the four magnets.

22. The linear position sensor of claim 21 wherein each of the four spaced apart magnets has only two steps.

23. The linear position sensor of claim 21 wherein the magnetic field strength along the axis of symmetry varies substantially linearly along the symmetry axis along a majority of the symmetry axis as it extends across the rectangle.

24. The linear position sensor of claim 21 wherein the first, second, third, and fourth magnets each have pole pieces mounted opposite the symmetry axis.

25. The linear position sensor of claim 21 wherein each magnet has three steps.

* * * * *